S. E. FINLEY.
APPARATUS FOR TREATING ROADWAYS.
APPLICATION FILED APR. 5, 1913.
1,124,407.
Patented Jan. 12, 1915.
3 SHEETS—SHEET 3.
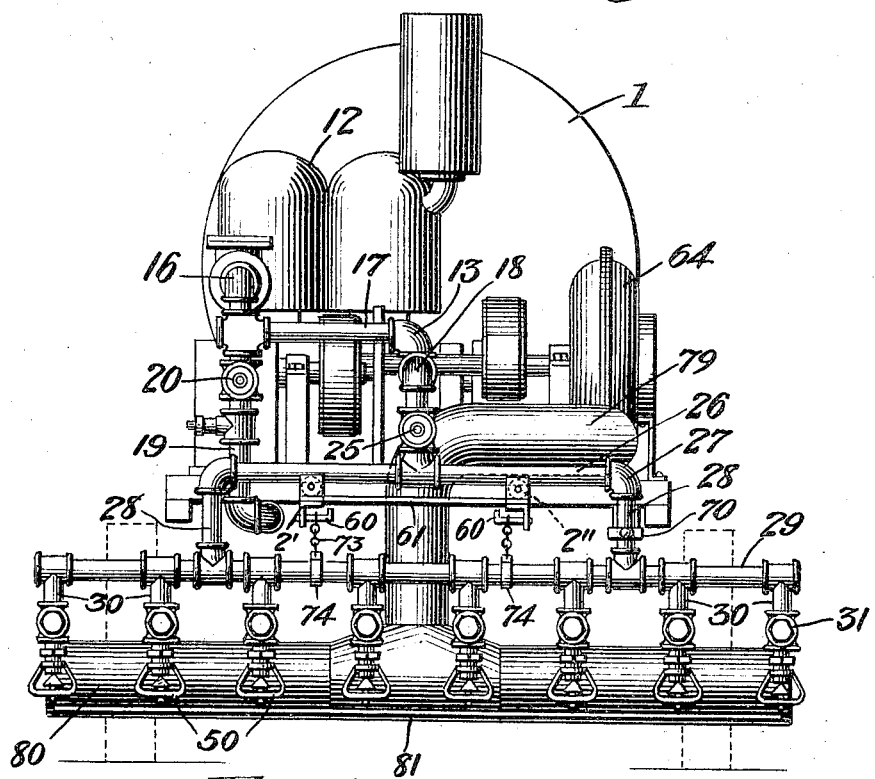
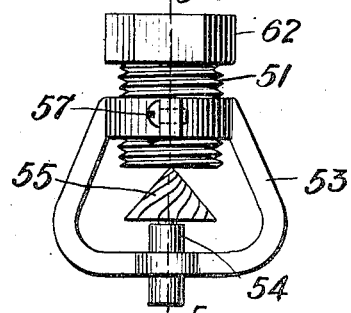
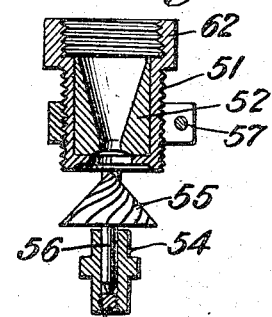

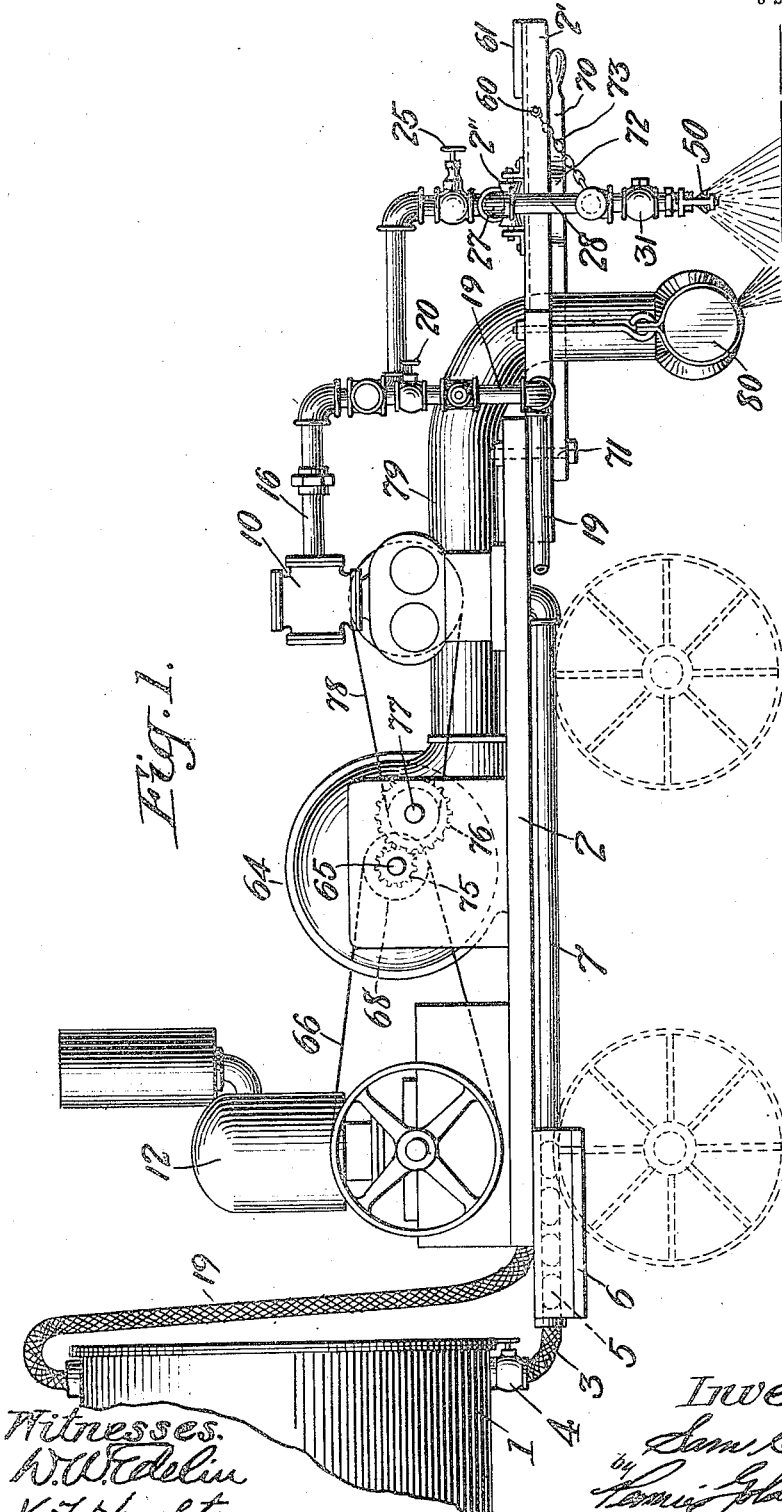

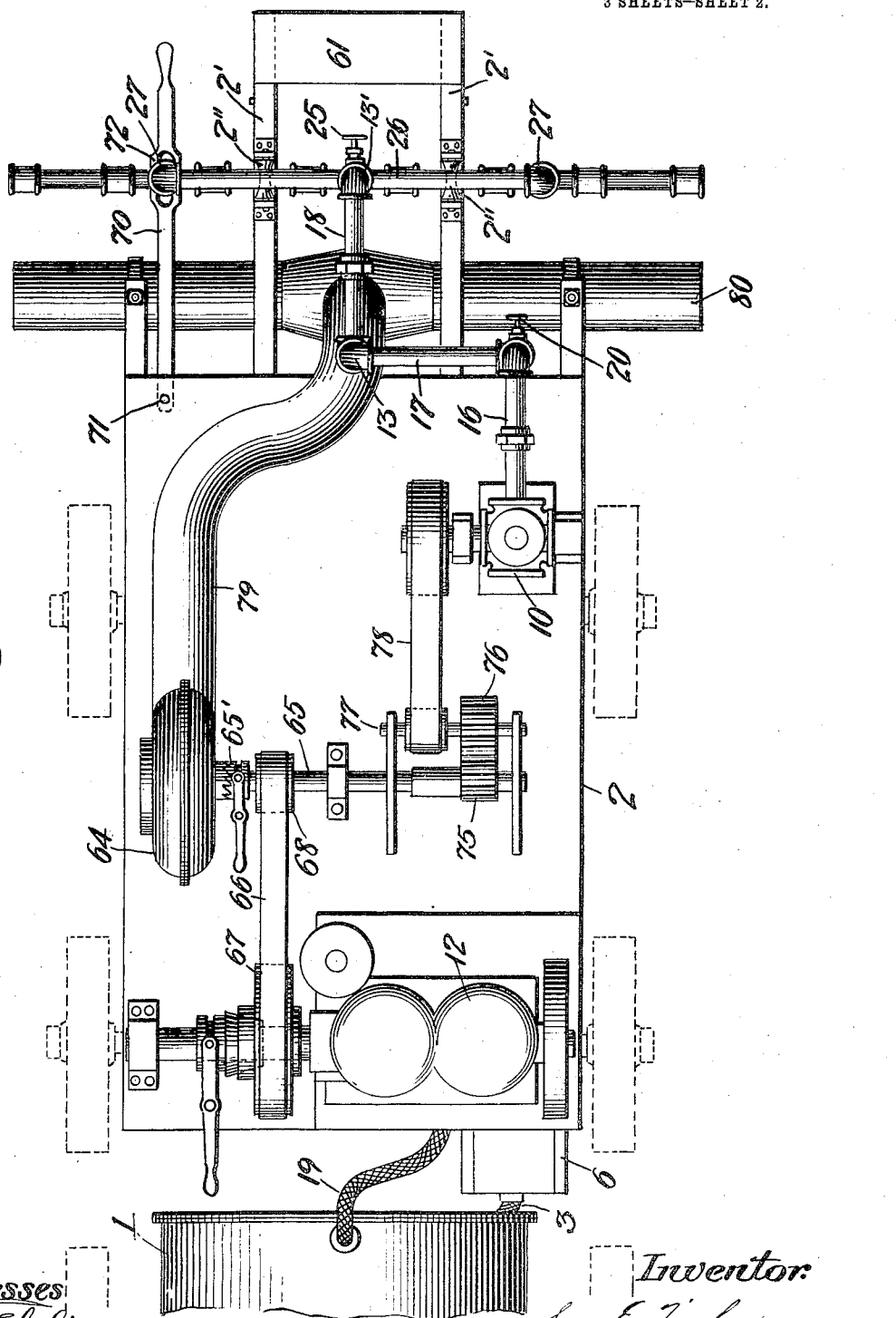

UNITED STATES PATENT OFFICE.

SAM EVERETT FINLEY, OF ATLANTA, GEORGIA.

APPARATUS FOR TREATING ROADWAYS.

1,124,407. Specification of Letters Patent. Patented Jan. 12, 1915.

Application filed April 5, 1913. Serial No. 759,044.

*To all whom it may concern:*

Be it known that I, SAM E. FINLEY, a citizen of the United States, and resident of Atlanta, in the county of Fulton and State of Georgia, have invented certain new and useful Improvements in Apparatus for Treating Roadways; and I do hereby declare the following to be a full, clear, and exact description of the invention, such as will enable others skilled in the art to which it appertains to make and use the same.

The present invention relates to apparatus for surface treating roadways, and has for its object to provide such an apparatus having means for supplying air to the road surface and means for delivering the preservative to the roadway in whirling conical sprays, these two means operating to produce the beneficial results hereinafter set forth.

The invention is illustrated in the accompanying drawings, in which:—Figure 1 represents a side elevation of the improved apparatus; Fig. 2 is a plan view of the apparatus shown in Fig. 1; Fig. 3 is a rear view of the apparatus shown in Figs. 1 and 2; Fig. 4 is a detail view of the preferred form of spraying nozzle employed; and Fig. 5 is a sectional view taken on line 5—5 in Fig. 4.

Throughout the several views, like reference characters refer to corresponding parts.

The preservative to be applied to the roadway, such as mineral oils, tar, asphalt, bituminous products or the like, is contained within a tank wagon, the rear portion of which is represented by the numeral 1, the said tank wagon being propelled along the roadway, in any suitable manner. Connected to the tank wagon 1 and adapted to follow directly therebehind, is the vehicle 2 carrying the apparatus which is adapted to supply the preservative to the roadway, in the manner hereinafter set forth.

The material is drawn from the tank wagon 1 through a connection 3 and cut-off valve 4 either by means of gravity or by means of a pump, hereinafter referred to. The heavy material, after leaving the tank 1, is heated by any suitable means, such as the heater 6 positioned on the vehicle 2 and containing the heating coil 5 through which the material passes on its way to the spraying mechanism. The coil 5 may be heated by any suitable means, such as a burner, charcoal or the like. From the heater 6 the preservative which is now in a more fluid state, passes through the pipe 7 to a pump 10 carried by the vehicle 2. Any suitable power plant may be employed for operating the pump 10, but in the present instance, a combustion engine 12 is employed connected to the pump in the manner hereinafter described.

The preservative is forced from the pump 10 through the pipes 16, 17 and 18 and control valve 25 to the horizontal supply pipe 26. A manifold 29 is connected to the supply pipe 26, preferably by means of the connecting pipes 28 and the elbows 27. The manifold 29 carries the distributing nozzles 30, which will hereinafter be more fully described.

A by-pass 19 connects the supply pipe 16 with the tank 1 for the purpose of by-passing a portion or all of the preservative back to the supply tank when such a condition is advisable. A valve 20 controls the by-pass 19 and regulates the amount of material by-passed to the supply tank.

The entire manifold 29 is preferably mounted upon the vehicle 2 for transverse movements thereon in such a manner that the said manifold or header 29 may be shifted longitudinally. The header is also preferably mounted on the vehicle 2 for angular movements with respect thereto, so that the distance between the roadway and the spraying nozzles may be regulated at will. In order to render the header 29 transversely shiftable, the supply pipe 26 is preferably supported by rollers 2″, suitably carried by the vehicle. In the present instance, two angle bars 2′ are shown secured to and projecting rearwardly of the vehicle 2 and the rollers 2″ are mounted on these angle bars. The horizontal pipe 18 has a swivel connection with the pipe 17, the latter having an elbow 13 in which the upturned extremity of the pipe 18 is free to turn. The pipe 18 also has a swivel connection with the supply pipe 26 at 13′. The entire header and its rigidly connected parts are, therefore, free to move transversely of the machine on the rollers 2″. The rollers 2″ are designed to permit a slight lateral movement of the pipe 26 caused by the movement of point 13′ in an arc of a circle. The header 29 is shifted, preferably by means of a handle 70 pivoted at 71 to the vehicle 2. The handle 70 is provided with a strap 72 which encircles one of the connecting pipes 28 of the supply pipe and, by actuating the handle around the pivot 71, it is obvious that a bodily movement of the header may be obtained. The elbows 27 have a swivel connection with the pipe 26, so that the header may be swung about the pipe 26 as an axis. The raising and lowering of the header is preferably accomplished by means of chains or the like 73 secured to the collars 74 on the header 29. The other ends of the chains are slipped over pins 60 carried by the angle bars 2'. The said pins have upturned extremities or other suitable means to prevent the chains from slipping off the pins. When it is desired to raise or lower the header, the chain is slipped off the pin, the header is adjusted, and that link of the chain 73 inserted over the pin, which will maintain and support the header in the desired position. The pins 60 are preferably made long enough to allow for the transverse movements of the header.

The handle 70 for actuating the header transversely of the vehicle and the chains 60 for actuating the header vertically are both so located that they may be actuated by the driver from a seat 61, preferably supported by the angle bars 2'.

The extremities of the plurality of nozzles carried on the header 29 are preferably provided with rotary sprayers 50 of the type illustrated in detail in Figs. 4 and 5. The said sprayers 50 are preferably connected to the nozzles by means of the hollow nuts 62 interiorly threaded for the purpose of screwing the same on the extremities of the nozzles, and provided with a hollow exteriorly threaded sleeve portion 51. Adjustably carried by the sleeve portion 51 is the bracket portion 53 in which the rotary distributer 55 is rotatably mounted. Preferably, the bracket carries a bearing member 54 in which the projecting pintle 56 on the conical distributer 55 engages. A small plug 63 screwed in the extremity of the bearing 54 serves as an end thrust bearing for the pintle 56 and also serves to adjust the height of the distributer 55 with respect to the sleeve-like portion 51 of the nut 62. Obviously, by turning the plug 63, the cone or distributer 55 may be raised or lowered with respect to the bracket by which the latter is carried. Located interiorly of the sleeve-like member 51 is a cup-shaped member 52 provided with a restricted orifice at the lower portion thereof, which is adapted to direct the fluid directly on the apex of the cone 55. By loosening the screw 57, which normally holds the embracing arms 56 of the bracket 53 tightly in engagement with the threaded portion 51, the bracket 53 may be turned and adjusted with respect to the nut 62. The sprayer cone 55 is therefore adjustable toward the orifice in the cup-shaped member 52 both by means of the plug 63, and by means of the adjustable bracket 53. The cups 52 are preferably made freely removable so that a cup having an orifice of the desired size to furnish a predetermined quantity of material to the sprayer 55 may be readily positioned. Valves 31 preferably located above the rotary sprayers 50 serve to cut off the supply of material to the respective sprayers 50 when so desired.

The means for supplying the blast of air to the roadway hereinbefore referred to consists of a fan or blower 64 connected by means of the conduit 79 to the air distributer 80. Said distributer 80 is supported from the vehicle 2 in advance of the oil distributing header 29, in any suitable way, and is provided with a slot or opening 81, preferably running the entire length of the distributer. The location of the slot 81 is such as to direct the blast of air toward the oil sprays, as best shown in Fig. 1.

The fan 64 and the pump 10 are driven from the engine 12, preferably as follows. The fan shaft 65 is driven from the engine 12 by means of a belt 66 running over pulleys 67 and 68 on the engine shaft and fan shaft respectively. The pump 10 is driven from the fan shaft by means of the intermeshing gears 75 and 76 carried by the fan shaft and counter-shaft 77 respectively. A belt 78 drives the pump from the said counter-shaft 77.

The operation of the apparatus is as follows. The valve 25 is first preferably closed to completely cut off communication between the tank and the header 29 and the valve 20 in the by-pass 19 is opened. The pump is then started whereby the preservative is drawn from the tank 1 through the heater 6 and then returned after passing through the pump 10 by means of the by-pass 19 back to the tank 1. This operation is continued until the preservative has reached the desired temperature and has reached the desired degree of fluidity. In order that the fan may remain inoperative during the by-passing of the preservative, a clutch may be interposed between the fan and the shaft 65, whereby the former may be thrown out of operation. When the preservative has been by-passed for a sufficient period, the valve 25 is opened to supply the material to the header and the by-pass valve 20 partly or wholly closed depending upon the amount of material which it is desirable to supply to the roadway. The heated preservative is then equally distributed in the header nozzles and providing the valves 31 are all opened, the preservative issues from all the cup-shaped members 52 under pressure furnished by the pump, impinges on the conical distributers 55 and causes the latter to rapidly rotate, due to a series of spirally arranged grooves or recesses provided on the surface of the cones. The material, therefore, issues from the nozzles in a conical spray and has imparted thereto a whirling motion by the rotary distributing cones 55.

The air issues from the distributer 80 in a flat sheet-like blast and is directed on the roadway immediately in advance of the spray of preservative. The air enters all the crevices and interstices of the road and forces out all dust, dirt and foreign matter, leaving each individual element of the ballasting absolutely clean and free from any coating which would prevent a thorough cohesion of the preservative or binder. Due to the special shape of the spray and the whirling motion of the fluid, every stone or object of the roadway will be completely encircled by the whirling fluid, so that the same is thrown inwardly toward the object and thoroughly covers or coats the same on all sides thereof. The fluid in whirling completely around each and every particle on the roadway will leave no portion of the particle uncovered by the preservative, as would be the case if the material were merely sprinkled on the roadway. In the latter case, there is no tendency for the material to be forced in under the individual particles and the result is that merely the top surfaces of the individual particles are coated.

The dust agitated by the air blast rises in a thick cloud and, due to the disposition of the opening in the air distributer 80, the cloud of dust is directed toward the whirling sprays of preservative which cause the suspended dust to whirl with them and become intimately admixed with the finely atomized and divided oil particles. That portion of the dust which is blown into the air and is not gripped by the whirling sprays and mixed with the oil while both are in suspension, settles on the surface of the roadway after the application of the preservative, and in that way is gripped and held by the oil coated surface of the roadway. It is seen therefore that the dust which previously laid in a loose and objectionable state is returned to the roadway in combination with the preservative. Due to the fact that the surface of the roadway has been thoroughly cleansed by the blast of air and each individual element of the ballasting thereby made to present a perfectly clean surface to the preservative, the latter in combination with the dust, when applied to the surface, enters all the cleaned out interstices and crevices between the elements of the ballasting and thereby intimately unites the latter and forms a perfect bond between them. As no layer of dust or dirt is interposed between the preservative and the stones or elements of the ballasting, the preservative is allowed to thoroughly grip and be retained by said elements.

It may sometimes be desirable to operate the machine without the air blast, under which conditions the loose dust or topping on the roadway is agitated and disturbed by the whirling spray and immediately rises in a thick cloud which comes in immediate contact with the relatively large surfaces of the sprays. The atomized and comminuted preservative issuing from the nozzles in a rapidly whirling condition immediately mixes with the agitated surface dust and a union between the preservative and the suspended dust particles takes place as before.

When it is desired to distribute the material over a greater surface, the chains 73 are adjusted to raise the header 29 the desired amount, the result being that the diameter of the base of each conical spray is increased and the same amount of material is therefore made to cover a greater area. If certain valves 31 be turned to cut off the supply of the preservative to corresponding nozzles and the header 29 raised the desired amount, the operative spraying nozzles may be made to distribute the material over the same surface as if all the nozzles were used and the header located in closer proximity to the ground. The quantity of material supplied through the nozzles may be controlled by the valve 25 and, in order to utilize the full extent of the pump, the valve 20 in the by-pass 19 may be so regulated that the excess preservative not capable of passing through the regulated valve 25 may be returned to the tank. The provision of the by-pass is therefore a valuable feature for, if the outlet of the fluid did not equal the capacity per minute that the pump was capable of handling, the result would be a breaking of the engine or the pump. The preservative may be applied under full pressure, therefore, independent of the quantity which is permitted to pass through the valve 25.

Due to the adjustability of the header 29 to raise and lower the same and to change the angularity of the nozzles with respect to the roadway, it is obvious that the operator may apply the desired quantity of material to the roadway per surface square yard.

The longitudinal adjustment of the header 29 permits the preservative to be applied to the roadway independent to a certain extent of the course pursued by the propelling means, inasmuch as the said header 29 may be actuated transversely to compensate for the zig-zag course pursued by the propelling means. If, for any reason, the vehicle 2 need be steered from its normal course, such as an obstacle in the roadway, the header 29 may be shifted laterally of the vehicle, so that the application of the preservative is not affected by the diversion of the vehicle from its normal path. In former constructions, the zig-zag course of the propelling means resulted in some sections of the road being untreated and parallel sections obtaining an excessive amount of the preservative, but, by the present invention, the preservative is applied in substantially a straight line, thereby uniformly distributing the preservative over the roadway.

I do not wish to be limited to the specific apparatus or arrangement of parts disclosed, since various modifications can be made without departing from the spirit or scope of the invention, as defined by the accompanying claims. The tank, for instance, may be located on the vehicle which carries the spraying apparatus and the same self-propelled or drawn along the roadway by any suitable means. Furthermore, the arrangement of the parts on the vehicle which carries the spraying apparatus is immaterial to the invention and the same may be arranged and mounted on the vehicle in any manner desired.

What I claim is:—

1. Apparatus for treating roadways with oil or the like, comprising a tank, multiple spray nozzles delivering rotary conical sprays to the road surface, a pump for delivering the material under pressure from the tank to said nozzles, and means to direct a blast of air on the roadway in advance of said rotary conical sprays.

2. Apparatus for treating roadways with oil or like preservative, comprising a tank to contain the preservative, multiple spray nozzles delivering rotary conical sprays to the road surface, means to supply the preservative from the tank to the nozzles, and means to direct a blast of air at low pressure but large volume to the roadway in advance of said spray nozzles.

3. Apparatus for treating roadways with oil or like preservative, comprising a tank to contain the preservative, multiple spray nozzles delivering rotary conical sprays to the road surface, means to supply the preservative from the tank to the nozzles, and means to direct a blast of air on the roadway toward said rotary conical sprays, whereby the surface of the roadway is cleansed of dust, said dust being admixed with the preservative issuing in the rotary conical sprays.

4. Apparatus for treating roadways with oil or like preservative, comprising a tank to contain the preservative, multiple spray nozzles delivering rotary conical sprays to the road surface, means to supply the preservative from the tank to the nozzles, and means comprising a distributer provided with an opening adapted to direct a sheet-like blast of air on the roadway in advance of said rotary conical sprays.

5. Apparatus for treating roadways with oil or like preservative, comprising a tank to contain the preservative, multiple spray nozzles delivering rotary conical sprays to the road surface, means to supply the preservative from the tank to the nozzles, and means to direct a sheet-like blast of air at an angle to the surface of the roadway and toward said rotary conical sprays.

6. Apparatus for treating roadways with oil or the like, comprising a tank, multiple spray nozzles delivering rotary conical sprays to the road surface, a pump for delivering the material under pressure from the tank to said nozzles, and means comprising a conduit of large cross section having a slot-like opening in its lower portion to direct a sheet-like blast of air at low pressure but large volume to the roadway in advance of said spray nozzles.

7. Apparatus for treating roadways with oil or like preservative, comprising a tank adapted to contain the preservative, multiple spray nozzles delivering rotary conical sprays to the road surface, means to supply the preservative from the tank to the nozzles, and means to supply air to the roadway in advance of said rotary conical sprays.

8. Apparatus for treating roadways with oil or like preservative, comprising a tank adapted to contain the preservative, multiple spray nozzles delivering rotary conical sprays to the road surface, means to supply the preservative from the tank to the nozzles, and means adjacent said spray nozzles for supplying air to the roadway.

9. Apparatus for treating roadways with oil or like preservative, comprising a tank adapted to contain the preservative, multiple spray nozzles delivering rotary conical sprays to the road surface, means for delivering the preservative under pressure from the tank to said nozzles, and means to direct a blast of air on the roadway in advance of said rotary conical sprays.

In testimony whereof I affix my signature, in presence of two witnesses.

SAM EVERETT FINLEY.

Witnesses:
J. C. LATINER,
JNO. W. YOPP.